April 28, 1953 — E. D. SMYSER — 2,636,479

FLOWMETER

Filed May 29, 1950 — 2 SHEETS—SHEET 1

INVENTOR.
ELMER D. SMYSER
BY
ATTORNEY

April 28, 1953          E. D. SMYSER          2,636,479
FLOWMETER
Filed May 29, 1950                                            2 SHEETS—SHEET 2
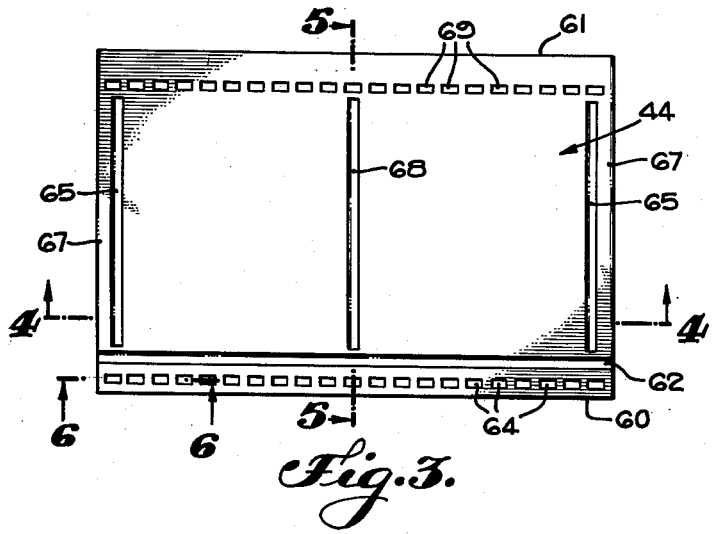
Fig. 3.
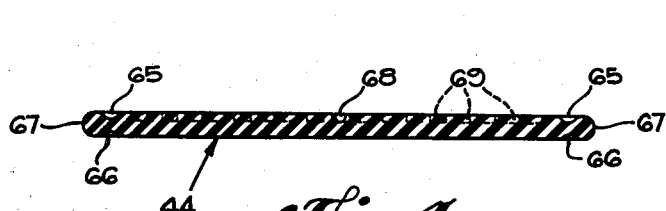
Fig. 4.
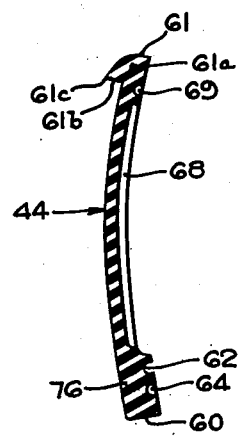
Fig. 5.
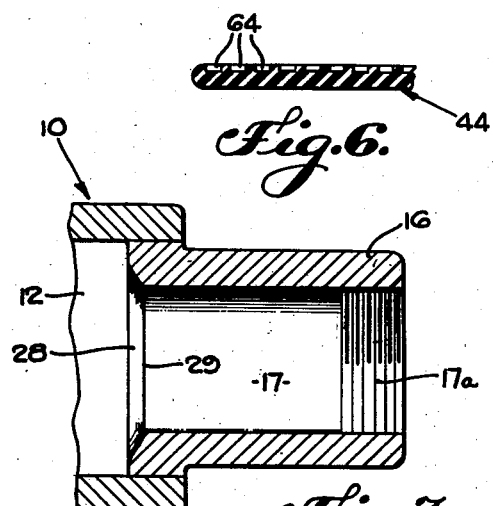
Fig. 6.
Fig. 7.
INVENTOR.
ELMER D. SMYSER
BY
ATTORNEY Patented Apr. 28, 1953

2,636,479

UNITED STATES PATENT OFFICE 2,636,479

FLOWMETER

Elmer D. Smyser, Bakersfield, Calif., assignor of one-half to Frederic C. Ripley, Sr., Los Angeles, Calif.

Application May 29, 1950, Serial No. 164,895

10 Claims. (Cl. 121—67)

This invention relates generally to fluid metering devices, and relates more particularly to flow meters for indicating the volume of flow through a conduit or pipe.

In many oil fields, a plurality of oil wells are connected together so as to discharge into a common tank or into a conduit common to all of the wells. The total production of all of the wells, so connected together, can be adequately measured in the tank, but it is desirable to have a metering device for indicating the production of each well.

It is therefore an object of the present invention to provide a flow meter which will indicate with reasonable accuracy the volume of flow of a well.

It is another object of the invention to provide a flow meter of the rotary type wherein the rotor carries a plurality of flexible sealing blades.

Still another object of the invention is to provide a device of this character wherein at all times there is a plurality of such sealing blades in effective sealing relationship with the wall of the stator in the line of flow between the inlet and outlet.

Still another object of the invention is to provide a device of this character wherein the blades are supported adjacent the outer ends thereof, but portions of the supporting means adjacent the outer corners will yield should foreign particles get in the way. Thus, a safety factor is provided which will minimize the danger of serious damage to the device.

A still further object of the invention is to provide a device of this character wherein the sealing blades are of rubber or a rubber-like material, and wherein means are provided for accommodating swelling of the blades, such swelling occurring particularly when hot oil is being metered.

Another object of the invention is to provide a device of this character having means for insuring contact of the outer or free edges of the sealing blades with the wall of the stator and producing the necessary differential pressure on opposite sides of the hub or shaft, between the inlet and outlet for proper functioning of the device.

Still another object of the invention is to provide a device of this character that is self-cleaning, and wherein friction is reduced to a minimum.

Other objects and advantages of the invention will appear in the following part of the specification.

Referring to the drawings, which are for illustrative purposes only,

Fig. 3 is a plan view of one of the flexible sealing blades;

Fig. 4 is a sectional view taken on line 4—4 of Fig. 3;

Fig. 5 is a sectional view taken on line 5—5 of Fig. 3;

Fig. 6 is a partial section taken on line 6—6 of Fig. 3; and

Fig. 7 is a partial section taken on line 7—7 of Fig. 1.

Figure 1:
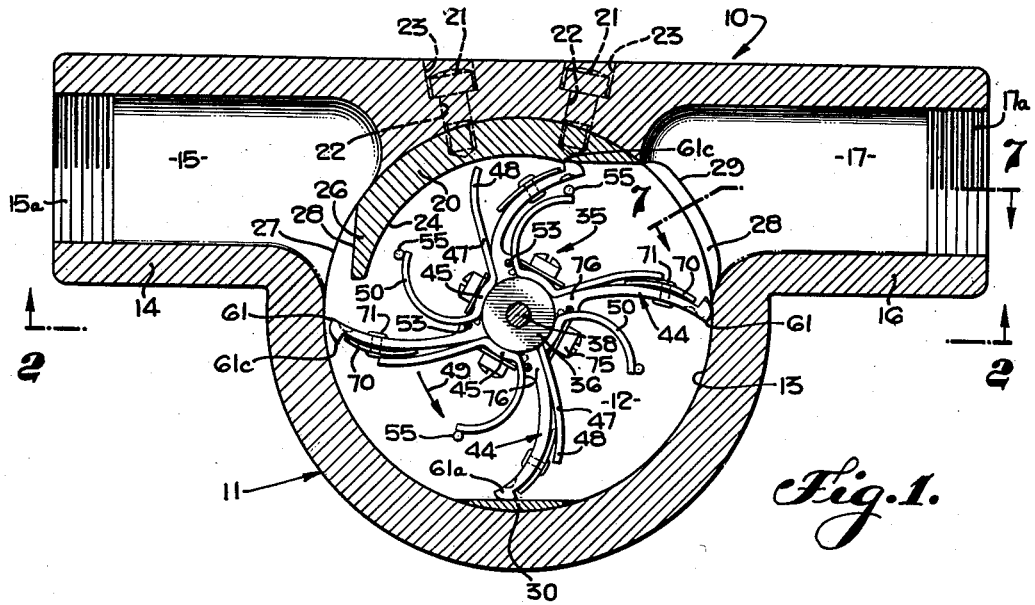
Fig. 1 is a partial section taken on line 1—1 of Fig. 2.

Referring more particularly to the drawings, the device comprises a body, indicated generally at 10, having a cylindrical part, indicated generally at 11, which may be termed the stator. Within the stator is a cylindrical chamber 12 defined by a cylindrical wall 13. The body 10 also includes an inlet 14 having an inlet passage 15 which may be internally threaded, as at 15a, for connection with a pipe line through which the fluid, such as oil, flows. There is also an outlet 16 having an outlet passage 17 which also may be internally threaded, as at 17a, for connection with the pipe line. The inlet and outlet are arranged in axial alignment and are generally tangential to the stator.

Within the chamber 12 is an arcuate shaped member 20 having its outer radius the same as the radius of the chamber 12. The member 20 is secured within the chamber 12 by any suitable means, such as screws 21, received in openings 22, provided therefor in the body 10. It is to be noted that the openings 22 are enlarged at 23 for reception of the heads of the screws 21, so that said heads will not project beyond the outer surface of the body 10.

The curvature of the inner side 24 of the member 20 is on a shorter radius than the radius of the cylindrical chamber 12, and said member 20 has an oil deflecting end portion 26 which extends over an inlet port 27, receiving oil from the inlet passage 15. The outer side of the end portion 26 is spaced inwardly from the plane of the inner wall 13 of the stator, as at 28, so that oil may freely enter the stator chamber 12 and be deflected circumferentially within said chamber.

At the outlet side of the chamber 12 the wall 13 is provided with a recess at 28, said recess extending across chamber 12 and communicating with an outlet port 29 connecting said chamber with the inlet passage 17.

Opposite the member 20 is a member 30 which extends across the chamber 12 and is secured to the wall 13 by any suitable means such as brazing, the purpose of said member 30 being described hereinafter.

The rotor, indicated generally at 35, is shown as comprising an axial shaft 36 within the chamber 12, and having axially projecting end portions 37 and 38 of reduced diameter, the projecting end portion 37 being mounted in a bearing 39 disposed in a recess in the end plate 40 of the stator. The end portion 38 is journaled in the end plate 41 of the stator and is provided with a seal 42 thereabout, and disposed within a recess provided therefor in the plate 41. The outer end portion of the projecting end portion 38 extends in to the housing of a counting or recording mechanism, indicated generally at 43, and is connected with said counting or recording mechanism for operating same.

The rotor 35 includes means for supporting a plurality of flexible sealing blades 44, said blade supporting means comprising a plurality of members, each of which includes an intermediate arcuate portion 45, the inner side of which fits snugly against the outer surface of the shaft 36. At one side edge of the intermediate arcuate portion 45 of each supporting member there is provided a plate 47 which extends in a generally radial direction with respect to the shaft 36, and has a free end edged portion 48 which is curved rearwardly with respect to the direction of rotation of the rotor, as indicated by the arrow 49. The opposite edge of the arcuate portion 45 also is provided with a plate 50, arcuate in cross section, and which curves outwardly and rearwardly with respect to the direction of rotation of the rotor. There is a rod or wire 53 brazed or otherwise secured to the plate 50, adjacent the inner end thereof and in outwardly spaced relation to the outer surface of the shaft 36. The rod or wire 53 is of substantially the same length as the width of the plate 50 and it will be noted that the supporting members for the flexible sealing blades are of less width than the length of the chamber 12, so that the side edges of said supporting members are spaced inwardly from the end plates 40 and 41 of the stator. However, the blades 44 extend entirely across the chamber 12 so that the side edges thereof are in sealing engagement with the end plates 40 and 41. Adjacent the free edge of the plate 50 there is also a rod or wire 55 which is brazed or otherwise secured thereto. The wire 55 extends outwardly of the side edges of the plate 50 and has end portions 56 which terminate in close proximity to said end plates 40 and 41. The supporting members for the sealing blades 44 are arranged in diametrically opposite pairs, and the inner ends of the plates 50 are spaced laterally from the inner ends of the plates 47 so as to provide room for the inner portions of the sealing blades 44. The spaces between the plates 47 and 50 of the supporting members may be considered as recesses which extend outwardly from the shaft 36.

The sealing blades are all of substantially the same construction, and hence, a description of one of said blades will suffice.

Each blade 44 comprises a piece of flat flexible material, such as rubber or a suitable rubber composition, natural or synthetic. There are various materials on the market at the present time, of suitable characteristics, it being desirable to have a composition which will be flexible, and also resistant to the deteriorating effects of heat and oil. Each blade is normally relatively flat. Adjacent the inner end or edge 60, in spaced parallel relation to said edge, there is a groove 62 which extends the full width of the blade and is adapted to receive the rod or wire 53 when the blades are installed. This arrangement prevents the blades from pulling out of the recesses formed by the portions 47 and 50 of the blade supporting members. Between the groove 62 and the edge 60 of the blade are a series of recesses 64 which are spaced apart from each other, as best shown in Fig. 3. These recesses 64 take care of any expansion which may occur at the inner end of the blade when subjected to oil.

Adjacent each side edge of the blade there is a groove 65 which extends substantially parallel with the respective side edges. The inner ends of the grooves 65 are spaced outwardly of the groove 62, and the outer ends of said grooves 65 terminate in spaced relation to the outer edge 61 of the blade. There is also a corresponding groove 66 adjacent each side edge of the blade 44 in the opposite side thereof. The side edge portions 67 of the blades are rounded, as best shown in Fig. 4, and, taken in conjunction with the grooves 65 and 66, form rolled or rounded edges. There is also an intermediate groove 68, between the grooves 65, the groove 68 being of substantially the same length as the groove 65, and said grooves 65, 66 and 68 allow for expansion of the blade.

Outwardly of the outer ends of the grooves 65 and 68 there are a plurality of recesses 69 which extend across the width of the blade in spaced relation to each other, said recesses 69 being adjacent to but in inwardly spaced relation to the outer edge 61 of the blade, which terminates in an enlargement or bead 61a having a shoulder 61b which extends laterally of the face of the blade and terminates in a relatively sharp edge 61c adapted to engage the inner arcuate surface 24 of the member 20, thereby providing a seal with said surface 24. The edge 61c also serves as a scraper or as scraper means to keep the surface 24 free of foreign matter and particles. It is to be noted that the bead 61a curves toward the opposite side of the blade, as at 61d, so that the edge 61c may engage said surface 24.

Figure 2:
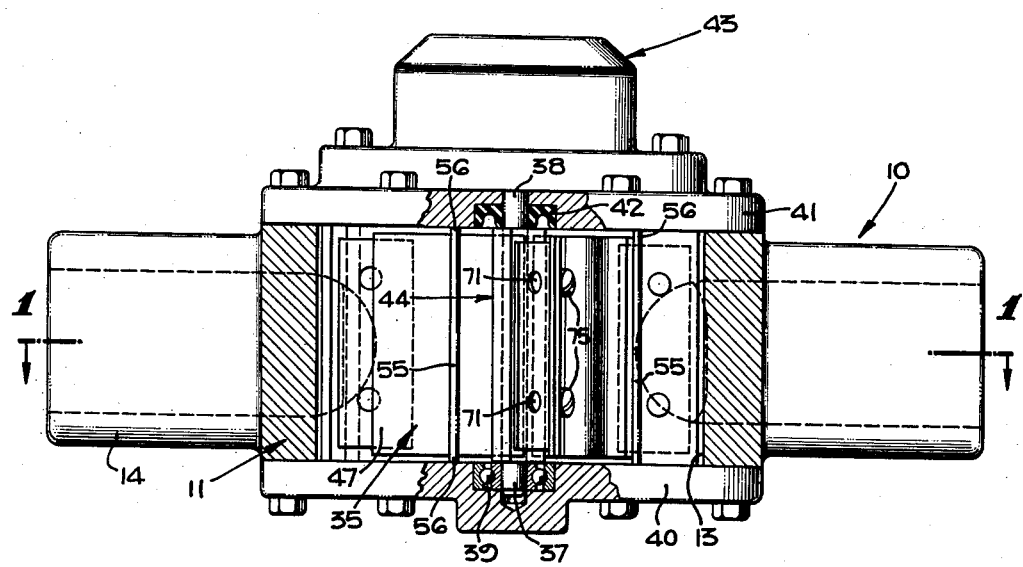
Fig. 2 is a sectional view taken on line 2—2 of Fig. 1.

Each blade is also provided with a stiff plate 70, Figs. 1 and 2, on the front side thereof, in respect to the direction of rotation of the rotor. The plates 70 are arcuate in cross section and are secured to the respective blades by rivets 71 or the like, said plates 70 being disposed adjacent the outer ends of the blades but terminate short of the side edges thereof. The outer edges of the plates 70 are adjacent to and are spaced inwardly from the shoulders 61b of the blades.

The means for supporting the flexible sealing blades are secured to the shaft 36 by means of screws 75 received in openings provided therefor in the portions 45 when the blade supporting means are in place. The plates 47 and 50 are spaced apart to provide for reception of the flexible sealing blades, and it will be noted that the inner end portions 76 of said blades are snugly received in the space between the inner ends of the plates 47 and 50 with the rods 53 disposed in the grooves 62, to thereby hold the flexible sealing blades against radial displacement.

In operation of the device, oil enters the inlet 15 and flows through the inlet port 27, being deflected in a generally tangential direction by the deflecting end portion 26 of the member 20. As the deflecting oil flows into the rotor chamber 12 it exerts pressure against the back side of a flexible sealing blade, and the pressure thus exerted urges the blade forwardly, with respect to the direction of rotation of the rotor, causing the plate 70 of said blade to engage the adjacent portion of plate 47. The plate extends in a generally radial direction outwardly of the end of said plate 47 and serves to provide additional support for the outer end of the flexible blade. Let it be assumed that there is oil in the chamber immediately ahead of the blade which has just passed the inlet 27. Such oil will prevent the contacting of the wall 13 by the outer end of the blade which has just passed the inlet. The preceding blade being already in contact with the member 30, will provide a seal against the passage of oil and effect positive rotation of the rotor in counterclockwise direction, as shown in Fig. 1. The blade which has not contacted the wall of the rotor will "float" until it engages the member 30, and the pressure behind said blade will then maintain sealing contact between the blade and the chamber wall.

Continued rotation of the rotor will cause the edge 61c of the shoulder 61b of the outer end of the flexible blade opposite the one which has just engaged the member 30 to engage the inner face of the member 20, the contour of said inner face being such as to cause the flexible blade in engagement therewith to be flexed rearwardly with respect to the direction of rotation of the rotor. When the flexible blade is fully flexed by its engagement with the member 20, the end portion of said flexible blade engages the adjacent rod 55 which serves to give additional support to said end portion. The engagement of the rod 55 with the blade end is substantially along the recesses 69, and while said rod gives additional support to the end portion of the blade for urging the edge 61c into sealing engagement with the surface 24 of the member 20, said recesses 69 permit expansion of said end portion of the blade under certain operating conditions wherein the temperature of the oil being metered is rather high. There may also be other conditions which cause expansion or swelling of the flexible blades, but the recesses 69 will compensate for such swelling.

As the blade progresses further in its path of rotation the free end portion will pass over the tip of the deflecting end portion 26 of the member 20 and the blade will then tend to straighten out and will operate as above described.

It is to be understood that when the flexible blades are normally extended with the pressure against the rear side, the portions or plates 47 and the plates 70 serve as supporting means for the front sides of said blades. When the flexible blades are flexed by engagement with the member 20 the respective plates 50 of the blade supporting means, together with the respective rods 55, serve to support the rear side of said blades.

The blade supporting parts 47 and 50 are of less length than the width of the chamber 12 but are sufficiently close to the side walls of said chamber as to provide support for the adjacent edges of the flexible blades. Hence, the ends of the flexible blades which contact the side walls of the chamber 12 are stiff enough to provide a tight seal and to scrape said side walls clean as the rotor rotates.

I claim:

1. In a flow meter: a body having a generally cylindrical chamber with an inlet, and an outlet spaced annularly therefrom; a member at one side of the chamber between the inlet and outlet reducing the area of said chamber therebetween; a rotor rotatably mounted within said chamber, said rotor including a plurality of generally radially arranged annularly spaced blades having free ends engageable with the inner wall of said chamber; and a member extending inwardly of the plane of the chamber wall located oppositely the first mentioned member between the inlet and outlet.

2. In a flow meter: a body having a generally cylindrical chamber with an inlet, and an outlet spaced annularly therefrom; an arcuate member extending inwardly of the chamber between the inlet and the outlet; a rotor rotatably mounted within said chamber and including a plurality of generally radially arranged annularly spaced flexible blades having free end portions curved oppositely of the direction of rotation of the rotor, the free ends of said blades being engageable with the inner peripheral wall of said chamber; means for supporting said flexible blades; and a member extending inwardly of the plane of the chamber wall, said member being located opposite said arcuate member and spaced annularly from the outlet a sufficient distance so as to be engaged by one of said flexible blades before a preceding blade reaches the chamber outlet.

3. The invention defined by claim 2, wherein said blades have stiffening means attached thereto adjacent the free ends thereof and the supporting means for the blades include means limiting movement of the blades relative to the rotor under pressure of fluid on the inlet side.

4. In a flow meter: a body having a generally cylindrical chamber with an inlet, and an outlet spaced annularly therefrom; an arcuate member extending inwardly of the chamber between the inlet and the outlet; a rotor rotatably mounted within said chamber and including a plurality of generally radially arranged annularly spaced flexible blades having free end portions curved oppositely of the direction of rotation of the rotor, the free ends of said blades being engageable with the inner peripheral wall of said chamber; means for supporting said flexible blades, said means including plate-like parts curved rearwardly relative to the direction of rotation of the rotor and rods secured to the plate-like parts adjacent the free ends thereof and extending longitudinally thereof for supporting the free end portions of the blades, said blades having recesses adjacent the free end portions thereof which will overlie the rods when the blades are in engagement with the arcuate member; and a member extending inwardly of the plane of the chamber wall, said member being located opposite said arcuate member and spaced annularly from the outlet a sufficient distance so as to be engaged by one of said flexible blades before a preceding blade reaches the chamber outlet.

5. In a flow meter: a body having a generally cylindrical chamber with an inlet, and an outlet spaced annularly therefrom; a member at one side of the chamber between the inlet and outlet reducing the area of said chamber therebetween; a rotor rotatably mounted within said chamber, said rotor including a plurality of generally radially arranged annularly spaced blades having free ends engageable with the inner wall of said chamber, said blades having recesses spaced inwardly of the marginal edges and an intermediate recess extending substantially parallel with the recesses adjacent the side edges to compensate for expansion of said blades; and a member extending inwardly of the plane of the chamber wall located oppositely the first mentioned member between the inlet and outlet.

6. A blade for a flow meter, comprising: a relatively thin body of flexible material having recesses therein adjacent to but spaced from the marginal edges thereof.

7. In a flow meter: a body having a cylindrical chamber with an inlet, and an outlet spaced annularly therefrom; a part at one side of the chamber extending inwardly of the plane of the chamber wall between the inlet and outlet reducing the area of said chamber therebetween; a rotor rotatably mounted within said chamber and including a plurality of generally radially arranged, annularly spaced blades having free ends engageable with the inner wall of said chamber; means for limiting movement of the blades relative to the rotor under pressure of fluid on the inlet side; and means secured to said blades adjacent the free ends thereof for stiffening same, said means being engageable with the limiting means.

8. In a blade for flow meters: a relatively thin body of flexible material; and a stiffening member extending laterally of said blade adjacent one end, said stiffening member being secured to said blade.

9. In a flow meter: a body having a generally cylindrical chamber with an inlet, and an outlet spaced annularly therefrom; a member at one side of the chamber between the inlet and outlet reducing the area of said chamber therebetween; a rotor rotatably mounted within said chamber, said rotor including a plurality of generally radially arranged annularly spaced flexible blades, said blades having a greater effective length than the radius of said chamber and having free ends engageable with the inner wall of said chamber; and a part extending inwardly of the plane of the chamber wall located generally oppositely of the first mentioned member between the said inlet and outlet.

10. In a flow meter: a body having a cylindrical chamber with an inlet, and an outlet spaced annularly therefrom; a part of one side of the chamber extending inwardly of the plane of the chamber wall between the inlet and outlet reducing the area of said chamber therebetween; a rotor rotatably mounted within said chamber and including a plurality of generally radially arranged annularly spaced blades having free ends engageable with the inner wall of said chamber; generally radially arranged means for limiting movement of the blades relative to the rotor under pressure of fluid on the inlet side, said means having a radial length less than the radius of the chamber and adapted to clear said part; and a relatively thin plate extending transversely of each blade and secured thereto adjacent the outer ends thereof, a portion of said plates being within the circumferential plane of the means for limiting movement of the blades relative to the rotor under pressure of fluid on the inlet side so that said plates are provided with partial support by said limiting means.

ELMER D. SMYSER.

References Cited in the file of this patent

UNITED STATES PATENTS

| Number | Name | Date |
|---|---|---|
| 268,522 | Müller | Dec. 5, 1882 |
| 1,053,321 | Schrock | Feb. 18, 1913 |
| 1,858,681 | Olson | May 17, 1932 |
| 2,189,356 | Briggs | Feb. 6, 1940 |
| 2,258,371 | Wernert | Oct. 7, 1941 |
| 2,332,411 | Swanson et al. | Oct. 19, 1943 |

FOREIGN PATENTS

| Number | Country | Date |
|---|---|---|
| 353,370 | France | June 27, 1905 |